(No Model.)
W. RACER.
COFFEE POT.
No. 385,880. Patented July 10, 1888.
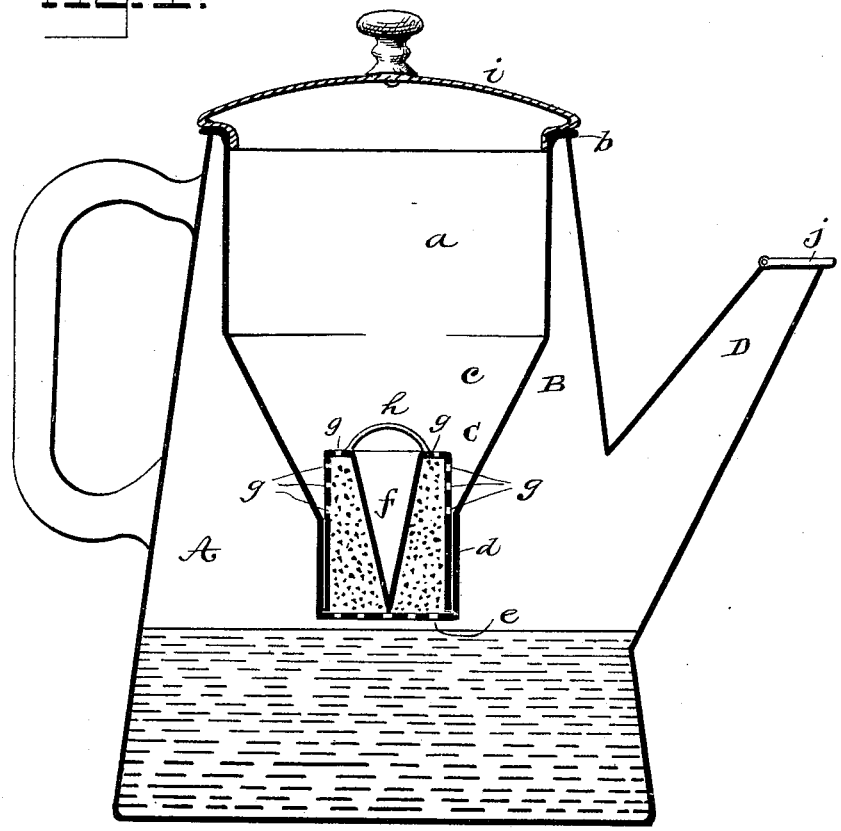
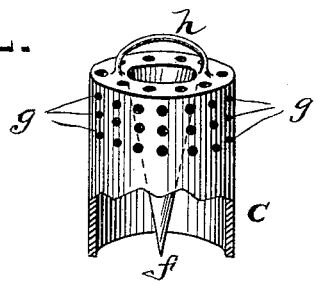
WITNESSES:
D. W. Mott.
C. Sedgwick.
INVENTOR:
W. Racer
BY Munn & Co
ATTORNEYS.

UNITED STATES PATENT OFFICE.

WILLIAM RACER, OF HARRISON, ARKANSAS.

COFFEE-POT.

SPECIFICATION forming part of Letters Patent No. 385,880, dated July 10, 1888.

Application filed January 16, 1888. Serial No. 260,879. (No model.)

*To all whom it may concern:*

Be it known that I, WILLIAM RACER, of Harrison, in the county of Boone and State of Arkansas, have invented a new and Improved Coffee-Pot, of which the following is a specification, reference being had to the annexed drawings, forming a part thereof, in which—

Figure 1 is a vertical transverse section of my improved coffee-pot; and Fig. 2 is a perspective view, with parts broken away, of the compressor.

Similar letters of reference indicate corresponding parts in both views.

The object of my invention is to provide a coffee-pot for making the extract of the coffee by percolation.

My invention consists in the construction and arrangement of parts, as will be hereinafter fully described and claimed.

To the top of the coffee-pot A is fitted a funnel, B, formed of the hollow cylindrical part $a$, having a flange, $b$, which rests upon the top of the coffee-pot, and a conical portion, $c$, connected with the cylindrical part $a$, and terminating in the cylindrical part $d$, having its lower end closed by a strainer, $e$. To the cylindrical part $d$ is fitted a hollow cylinder, C, which is longer than the cylindrical part $d$, and which is open at the lower end and closed at the upper end.

In the center of the hollow cylinder C is supported an inverted cone, $f$, by attachment to the under surface of the top of the cylinder, and the sides and top of the cylinder C above the cylindrical part $d$ of the funnel B are provided with perforations $g$. The handle $h$ is attached to the top of the cylinder C. To the top of the funnel B is fitted a cover, $i$, and to the end of the spout D is hinged a cover, $j$, which is capable of closing the end of the spout. The cylinder C being removed from the funnel B, a quantity of finely-ground coffee is placed in the cylindrical part $d$ of the funnel B upon the strainer $e$, when the cylinder C is forced downward into the ground coffee, thereby compressing the coffee and forcing it upward into the cylinder around the inverted cone $f$. The ground coffee is thus held securely in place in the lower part of the funnel B, and water poured into the said funnel percolates through the coffee, dissolving out the soluble portions, while the insoluble parts remain as a spongy mass in the cylinder C. The cover $j$ upon the spout D prevents the escape of the aromatic steam of the coffee.

My improved apparatus, which I have here described in connection with the making of coffee, is adapted to any use where extracts are to be made by percolation.

Having thus described my invention, I claim as new and desire to secure by Letters Patent—

In a coffee-pot, the funnel B, having a supporting-flange at its upper end and a cylindrical lower end, $d$, having a strainer, $e$, forming its bottom, in combination with the bottomless cylinder C, of greater length than the cylinder $d$, fitting therein, and having perforations $g$ in its top and side walls above the upper end of said cylinder, the inverted imperforate compressing-cone $f$, depending from the top of cylinder C, and the handle $h$ on top of said cylinder, substantially as set forth.

WILLIAM RACER.

Witnesses:
R. F. KING, Jr.,
W. T. KENDRICK.